US012354450B2

(12) United States Patent
Jikuhara et al.

(10) Patent No.: US 12,354,450 B2
(45) Date of Patent: Jul. 8, 2025

(54) DELIVERY SUPPORT DEVICE, SYSTEM, AND DELIVERY SUPPORT METHOD

(71) Applicant: TOYOTA JIDOSHA KABUSHIKI KAISHA, Aichi-ken (JP)

(72) Inventors: Yoshikazu Jikuhara, Miyoshi (JP); Jun Hioki, Nagakute (JP); Kaori Yamada, Nagakute (JP); Maiko Watanabe, Nagoya (JP); Yuki Kuwayama, Yokohama (JP); Shunya Maruta, Tokyo (JP); Yo Okumura, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 142 days.

(21) Appl. No.: 18/346,270

(22) Filed: Jul. 3, 2023

(65) Prior Publication Data

US 2024/0013639 A1 Jan. 11, 2024

(30) Foreign Application Priority Data

Jul. 5, 2022 (JP) ................................ 2022-108608

(51) Int. Cl.
*G08B 13/02* (2006.01)

(52) U.S. Cl.
CPC .................................. *G08B 13/02* (2013.01)

(58) Field of Classification Search
CPC .. A61M 60/871; A61M 60/148; A61M 60/50; A61M 2205/3365; A61M 2205/3368; A61M 2205/3523; A61M 2205/3592; A61M 2205/52; A61M 2205/8243; H02J 50/80; H02J 50/10; H04W 76/30; H04W 76/10; H04W 4/40; H04L 12/189; G06Q 10/08; G06Q 10/00; G06Q 10/083; G06Q 10/087; G06Q 10/043; G06Q 10/0832; G06Q 10/0833; G01G 19/00; G01G 19/005; G06N 20/00; G06N 3/08; G06T 7/70; G06V 10/10; G06V 10/82; G06V 20/64; G06V 20/52; G06V 20/176; G06V 2201/07; Y02T 10/40;
(Continued)

(56) References Cited

U.S. PATENT DOCUMENTS

| | | | | |
|---|---|---|---|---|
| 9,892,379 | B1 * | 2/2018 | Danyluk | G08B 29/188 |
| 11,466,998 | B1 * | 10/2022 | Williams | G06Q 10/0635 |

(Continued)

FOREIGN PATENT DOCUMENTS

| | | | |
|---|---|---|---|
| CN | 205563683 U * | 9/2016 | |
| DE | 102016009572 A1 | 11/2017 | |

(Continued)

*Primary Examiner* — Brian A Zimmerman
*Assistant Examiner* — Anthony D Afrifa-Kyei
(74) *Attorney, Agent, or Firm* — HAUPTMAN HAM, LLP

(57) ABSTRACT

The delivery support device supports delivery of the article. The delivery support device includes a control unit configured to acquire first weight data indicating a weight of an article measured at a first time point in a transportation process of an article and second weight data indicating a weight of the article measured at a second time point after the first time point, and determine whether to notify the user of a warning based on a result of comparing the weight indicated by the first weight data and the weight indicated by the second weight data.

14 Claims, 4 Drawing Sheets

(58) Field of Classification Search
CPC .......... G08B 13/1472; G08B 13/19608; G08B 13/1965; G08B 3/10; G08B 13/19645; G06K 9/00771; G06K 9/00637; G06K 2209/21; G05D 1/0094; G05D 1/12; B64C 39/024; B64C 2201/127; B64U 10/13; B64U 2101/25; B64U 2101/30; B64U 2101/00; B64U 2101/31; B64U 2101/32
See application file for complete search history.

(56) References Cited

U.S. PATENT DOCUMENTS

| | | | |
|---|---|---|---|
| 2004/0215351 | A1 | 10/2004 | Kiire et al. |
| 2015/0379468 | A1 | 12/2015 | Harvey |
| 2019/0236741 | A1 | 8/2019 | Bowman et al. |

FOREIGN PATENT DOCUMENTS

| | | | |
|---|---|---|---|
| JP | 2002-338051 | A | 11/2002 |
| JP | 2004-321968 | A | 11/2004 |

* cited by examiner

DELIVERY SUPPORT DEVICE, SYSTEM, AND DELIVERY SUPPORT METHOD

CROSS-REFERENCE TO RELATED APPLICATION

This application claims priority to Japanese Patent Application No. 2022-108608 filed on Jul. 5, 2022 incorporated herein by reference in its entirety.

BACKGROUND

1. Technical Field

The present disclosure relates to a delivery support device, a system, and a delivery support method.

2. Description of Related Art

US Patent Application Publication No. 2015/0379468 discloses a technique for delivering a package to a plurality of delivery destinations in two stages by using an on-road vehicle and an autonomous delivery vehicle.

SUMMARY

During transportation of an article, such as luggage, the package may be lost due to the package in the luggage being dropped, or the package may be stolen due to being taken out, for example. In the event of such a loss or theft of an item, it is required to identify a transportation process in which the loss or theft has occurred. However, it is conventionally difficult to identify the transportation process in which the loss or theft occurred, and there is room for improvement.

It is an object of the present disclosure to be able to identify a transportation process in which a loss or theft has occurred.

A delivery support device according to the present disclosure is a delivery support device that supports delivery of an article, the delivery support device including a control unit that acquires first weight data indicating a weight of the article measured at a first time point in a transportation process of the article and second weight data indicating a weight of the article measured at a second time point after the first time point, and determines whether to notify a user of a warning, based on a result of comparing the weight indicated by the first weight data with the weight indicated by the second weight data.

A delivery support method according to the present disclosure is a delivery support method that supports delivery of an article, the delivery support device including:

causing a control unit to acquire first weight data indicating a weight of the article measured at a first time point in a transportation process of the article, and second weight data indicating a weight of the article measured at a second time point after the first time point;

causing the control unit to compare the weight indicated by the first weight data with the weight indicated by the second weight data; and causing the control unit to determine whether to notify a user of a warning, based on a determination result acquired by comparing the weight indicated by the first weight data with the weight indicated by the second weight data.

According to the present disclosure, it is possible to identify a transportation process in which a loss or a theft has occurred.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
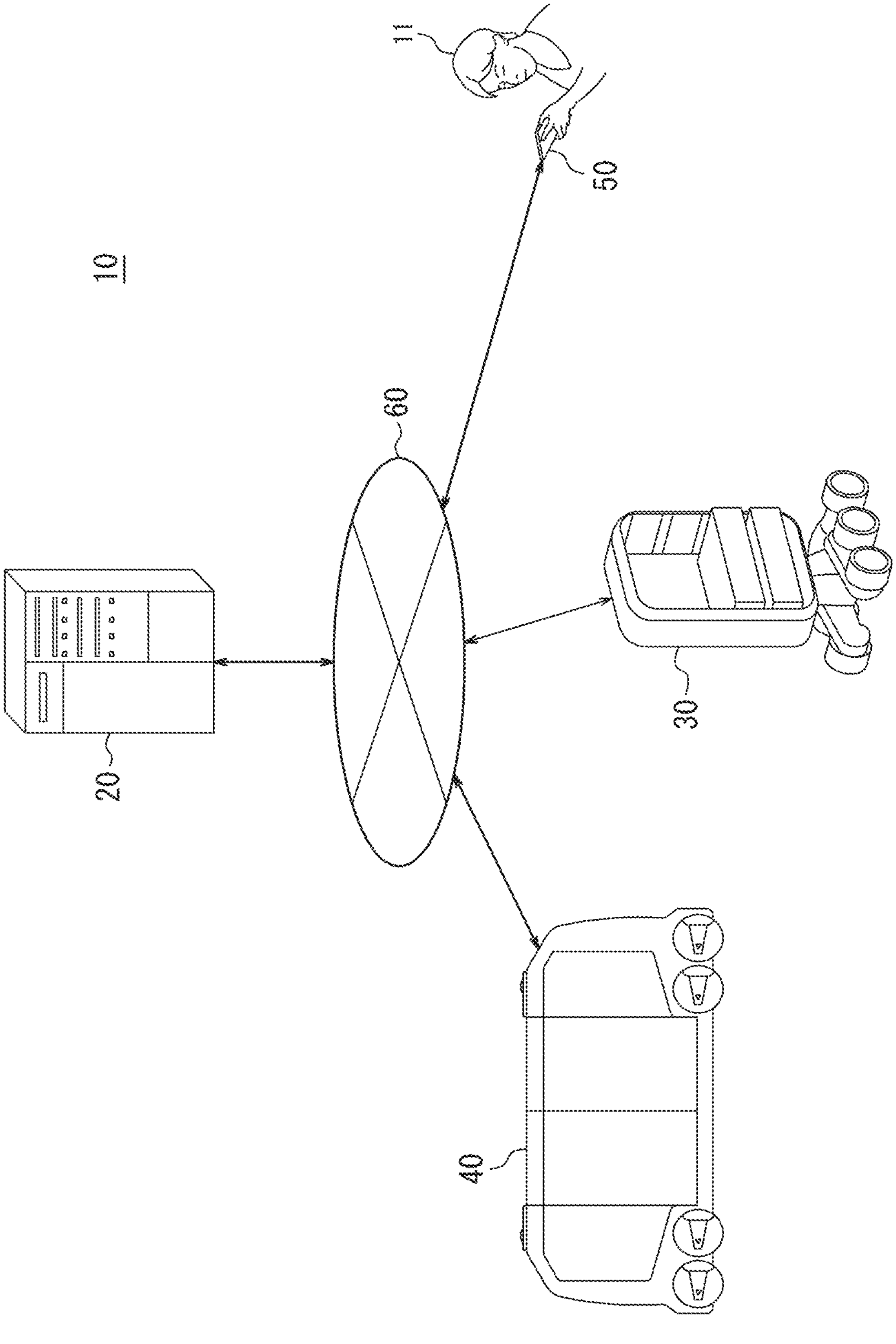
FIG. 1 is a diagram illustrating a configuration of a system according to an embodiment of the present disclosure.

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

The configuration of a system 10 according to the present embodiment will be described with reference to FIG. 1.

The system 10 according to the present embodiment includes at least one delivery support device 20, at least one mobile body 30, at least one vehicle 40, and at least one terminal device 50. The delivery support device 20 is capable of communicating with the mobile body 30, the vehicle 40, and the terminal device 50 via the network 60.

The delivery support device 20 is installed in a facility such as a data center and is operated by an operator who manages the system 10. The business operator is, for example, a delivery business operator that delivers goods such as baggage from a customer to a designated destination. The delivery support device 20 is a computer such as a server belonging to a cloud computing system or other computing system.

The one or more terminal devices 50 may be held by one or more users 11, or may be installed at any location, such as at the home of the user 11, and used by the user 11. The terminal device 50 is, for example, a mobile device such as a mobile phone, a smart phone, or a tablet, or a personal computer (PC). In the present embodiment, the user 11 is the addressee of the package LG, but the user 11 may be the sender of the package LG. Alternatively, the user 11 may be an administrator of the system 10. When the user 11 is an administrator of the system 10, the terminal device 50 may be installed in a management room of the system 10 and used by the one or more users 11. Alternatively, the terminal device 50 installed in the management room may be shared by two or more users 11.

Vehicle 40 is any type of vehicle, such as a gasoline-powered vehicle, a diesel-powered vehicle, a hydrogenpowered vehicle, hybrid electric vehicle (HEV), plug-in hybrid electric vehicle (PHEV), battery electric vehicle (BEV), or fuel cell electric vehicle (FCEV. Vehicle 40 is autonomous vehicle (AV) in this embodiment, but may be driven by a driver or may be automated in driving at any level. The level of automation is, for example, any of level 1 to level 5 in the level division of Society of Automotive Engineers (SAE). The vehicle 40 may be a Mobility as a Service (MaaS) dedicated vehicle.

In the present embodiment, the vehicle 40 transports an article. In this embodiment, the article is a package LG containing one or more items therein. The vehicle 40 is provided with a weight sensor WS1 that detects the weight of a package LG mounted on the vehicle 40. Vehicle 40 loads the package LG sent from the sender and transports it to the intermediate delivery point. In the present embodiment, the intermediate delivery point is a location where a plurality of packages including the package LG is delivered from the vehicles 40 to the mobile body 30. Specifically, the intermediate delivery point is a standby place of the mobile body 30 in the apartment house. Alternatively, the intermediate delivery point is an intermediate collection and delivery point for delivery of the plurality of packages including the package LG. At the intermediate delivery point, the package LG is delivered from the vehicles 40 to the mobile body 30.

The mobile body 30 is a logistics robot 301 that autonomously delivers the package LG. The mobile body 30 includes any delivery vehicle that moves between points by autonomous driving. The mobile body 30 may be, for example, a humanoid robot. Alternatively, the mobile body 30 may be any unmanned aerial vehicle that flies autonomously, for example a drone. The mobile body 30 may be positioned as a second vehicle relative to the vehicle 40. The mobile body 30 may be an in-hall logistics robot that is installed in an apartment house such as an apartment house or an apartment house, and specializes in delivering a package LG to each house in the apartment house.

In the present embodiment, when the package LG is delivered from the vehicle 40, the mobile body 30 autonomously delivers the package to the delivery destination of the package LG. In the present embodiment, the delivery destination is the door of the addressee of the package LG. Upon arriving at the delivery destination, the mobile body 30 delivers the package LG to the user 11 who is the addressee of the package LG. The mobile body 30 is provided with a weight sensor WS2 that detects the weight of the package LG mounted on the mobile body 30. The mobile body 30 may be provided with a door sensor CS for detecting that the door CV of the accommodation unit for accommodating the package LG is opened.

Network 60 includes the Internet, at least one wide area network (WAN), at least one metropolitan area network (MAN), or any combination thereof. The network 60 may include at least one wireless network, at least one optical network, or any combination thereof. The wireless network is, for example, an ad hoc network, a cellular network, a wireless local area network (LAN), a satellite communication network, or a terrestrial microwave network.

The outline of the present embodiment will be described with reference to FIGS. 1 and 2.

In the system illustrated in FIG. 1, the delivery support device 20 that supports delivery of an article acquires the first weight data WD1 and the second weight data WD2. The first weight data WD1 is data indicating a weight W1 of the article measured at the first time point T1 in the transportation process of the article. The second weight data WD2 is data indicating a weight W2 of the article measured at the second time point T2 after the first time point T1. The delivery support device 20 compares the weight W1 indicated by the first weight data WD1 with the weight W2 indicated by the second weight data WD2. The article may be any article that can be transported by the vehicle 40 or the mobile body 30, but in the present embodiment, the package LG contains one or more articles therein. The first time point T1 may be any time point in the transportation process of the article, but in the present embodiment, it is any time point in the first period P1 from when the package LG is sent out from the sender until when it is mounted on the vehicle 40. The second time point T2 may be any time point as long as it is a time point later than the first time point T1, but is any time point in the second time point P2 from when the package LG is delivered from the vehicle 40 to the mobile body 30 until when the mobile body 30 starts delivering the package LG.

The delivery support device 20 determines whether to notify the user 11 of the warning AL based on the determination result obtained by comparing the weight W1 indicated by the first weight data WD1 and the weight W2 indicated by the second weight data WD2. Specifically, when it is determined that the weight W2 indicated by the second weight data WD2 is smaller than the weight W1 indicated by the first weight data WD1, the delivery support device 20 determines to notify the user 11 of the warning AL.

According to the present embodiment, it is detected that the item stored in the package LG has been lost or stolen based on the fact that the weight of the package LG during delivery has decreased. Further, by comparing the weight W1 indicated by the first weight data WD1 and the weight W2 indicated by the second weight data WD2, the transportation process in which the lost or stolen occurred can be estimated to be between the first time point T1 and the second time point T2. That is, the transportation process in which the loss or theft has occurred is identified without constantly monitoring the article being transported.

According to the present embodiment, in the system 10, a plurality of packages including a package LG are delivered to a door (a house) in an apartment house (an apartment house, a condominium, or the like). Referring to FIG. 2, a basic process of delivering a package LG issued by the user 11 as an addressee to the user 11 of the house 121 in the apartment house 100 will be described.

Figure 2:
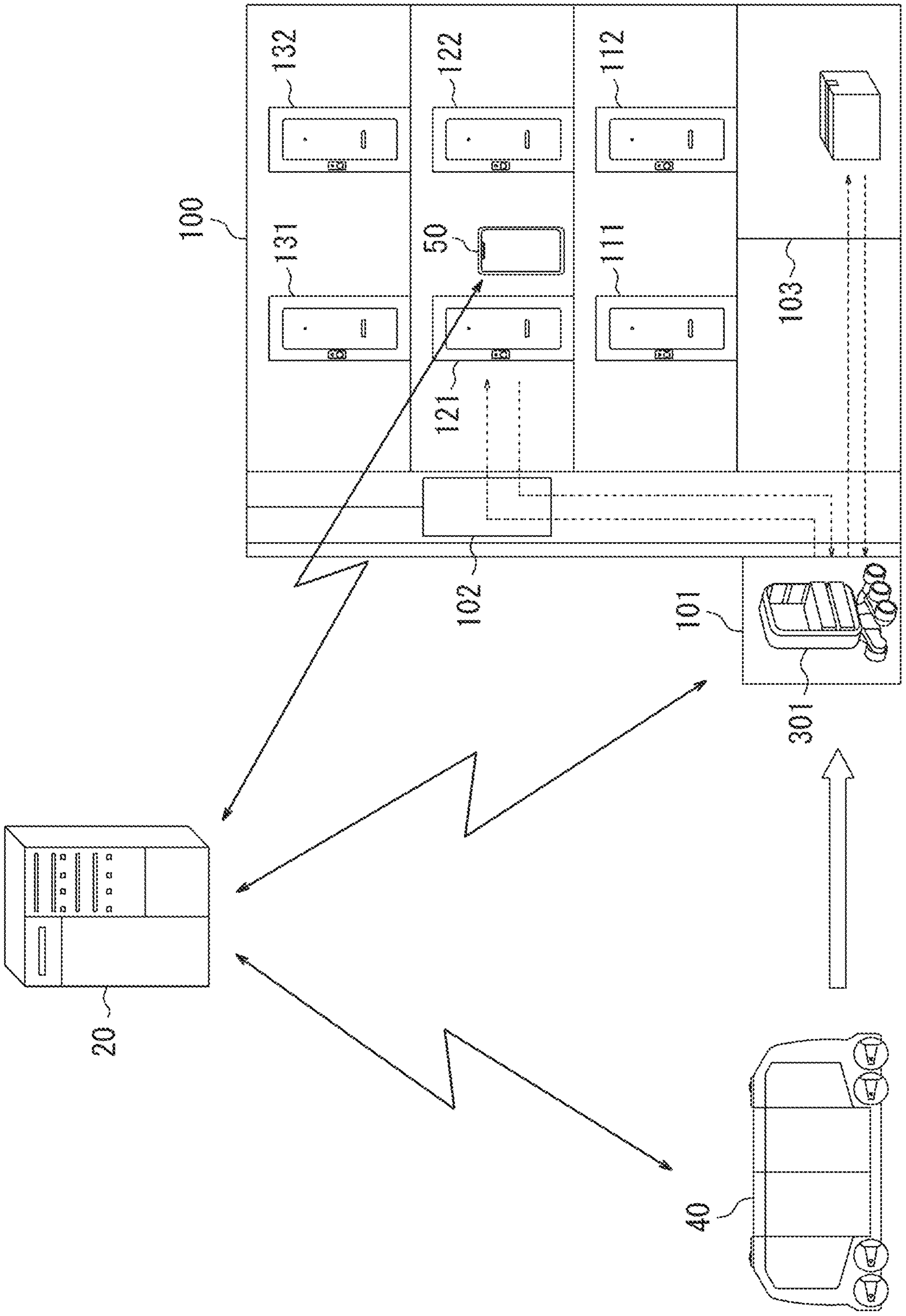
FIG. 2 is a diagram illustrating an example of delivery by a system according to an embodiment of the present disclosure.

In FIG. 2, the apartment house 100 includes a plurality of houses 111,112,121,122,131,132. Further, in the facility of the apartment house 100, a logistics robot 301 as a mobile body 30 that delivers a package to each residence is permanently installed. The apartment house 100 includes a standby space 101 in which the logistics robot 301 stands by, an elevator 102 for the logistics robot 301 to move between floors, and a temporary storage space 103 for temporarily storing a load. Although one logistics robot 301 is illustrated in FIG. 2, the number of logistics robots 301 is not limited to one, and 30N may be permanently installed from a plurality of logistics robots 301.

The vehicles 40 load a plurality of packages including the package LG based on a command from the delivery support device 20, and move to the apartment house 100. In addition to the package to be delivered to the apartment house 100, the vehicle 40 may also be loaded with the package to another house to be delivered collectively.

The vehicles 40 arrive in the standby space 101 of the apartment house 100 and deliver the package LG to the logistics robots 301 waiting in the standby space 101. In the present embodiment, the standby space 101 in which the logistics robot 301 stands by serves as an intermediate delivery point. In the present embodiment, the intermediate delivery point is a location where the package LG is delivered from the vehicle 40 to the logistics robot 301. Transfer of the package LG is performed using a driving unit included in the vehicle 40 or a driving unit included in the logistics robot 301 as the mobile body 30. The drive unit includes at least one of an arm mechanism driven by a motor and a slide mechanism capable of linearly sliding a load. Alternatively, the package LG may be delivered by an operator who has ridden on the vehicles 40.

The delivery support device 20 transmits delivery detail information to the logistics robot 301. The delivery detailed information includes, for example, delivery information indicating a delivery destination such as an address of an addressee of the package LG and information on a delivery route. If the delivery destination can be read from the package LG by the logistics robots 301, the delivery destination address may be omitted. The delivery route can be arbitrarily selected, but it is desirable that a route that enables the logistics robot 301 to efficiently deliver the package LG is selected, for example, a route that minimizes the distance from the standby space 101 to the delivery destination.

The logistics robots 301 move within the apartment house 100 in a self-propelled manner, and deliver the package LG to the house 121 which is a delivery destination. The package LG may be placed in front of the home of the delivery destination, or may be a so-called place, but if the logistics robot 301 is provided with an outputting unit, it is desirable to notify the user 11 of the arrival by sound or the like and directly pass the package LG to the user 11.

Figure 3:
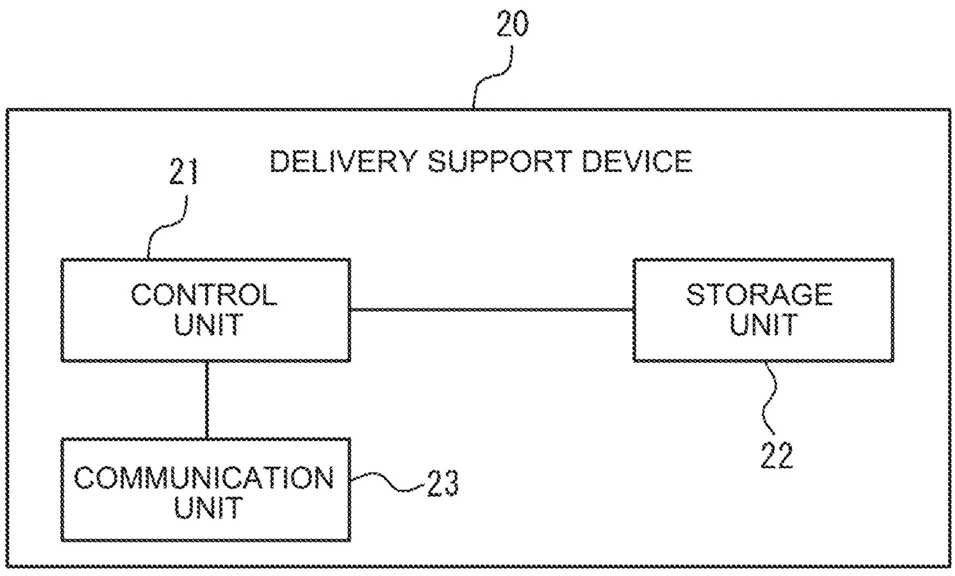
FIG. 3 is a block diagram illustrating a configuration of a delivery support device according to an embodiment of the present disclosure.

A configuration of the delivery support device 20 according to the present embodiment will be described with reference to FIG. 3.

The delivery support device 20 includes a control unit 21, a storage unit 22, and a communication unit 23.

The control unit 21 includes at least one processor, at least one programmable circuit, at least one dedicated circuit, or any combination thereof. A processor is a general-purpose processor such as central processing unit (CPU) or graphics processing unit (GPU), or a special-purpose processor specialized for a particular process. Programmable circuitry is, for example, an abbreviation for field-programmable gate array (FPGA). Dedicated circuitry is for example the abbreviation application specific integrated circuit (ASIC). The control unit 21 executes processing related to the operation of the delivery support device 20 while controlling each unit of the delivery support device 20.

The storage unit 22 includes at least one semiconductor memory, at least one magnetic memory, at least one optical memory, or any combination thereof. Semiconductor memories are, for example, random access memory (RAM) or read only memory (ROM). "RAM is, for example, static random access memory (SRAM) or dynamic random access memory (DRAM). ROM is, for example, electrically erasable programmable read only memory (EEPROM). The storage unit 22 functions as, for example, a main storage device, an auxiliary storage device, or a cache memory. The storage unit 22 stores data used for the operation of the delivery support device 20 and data obtained by the operation of the delivery support device 20.

The communication unit 23 includes at least one communication interface. The communication interface is, for example, a LAN interface. The communication unit 23 communicates with one or more mobile bodies 30, one or more vehicles 40, and one or more terminal devices 50. The communication unit 23 receives data used for the operation of the delivery support device 20 and transmits data obtained by the operation of the delivery support device 20.

The function of the delivery support device 20 is realized by executing the program according to the present embodiment by a processor serving as the control unit 21. That is, the functions of the delivery support device 20 are realized by software. The program causes the computer to execute the operation of the delivery support device 20, thereby causing the computer to function as the delivery support device 20. That is, the computer functions as the delivery support device 20 by executing the operation of the delivery support device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. Distribution of the program is performed, for example, by selling, transferring, or lending a portable medium such as a Secure Digital (SD) card, digital versatile disc (DVD), or compact disc read only memory (CD-ROM storing the program. The program may be distributed by storing the program in the storage of the server and transferring the program from the server to another computer. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. Processing may be performed by a so-called ASP (application service provider type service. This service does not transfer a program from a server to a computer, but only implements a function by an execution instruction and a result-acquisition. The program includes information that is used for processing by electronic computers and equivalent to a program. For example, data that is not a direct command to a computer but has the property of defining the processing of the computer corresponds to the "data equivalent to a program".

Some or all of the functions of the delivery support device 20 may be realized by a programmable circuit or a dedicated circuit as the control unit 21. That is, some or all of the functions of the delivery support device 20 may be realized by hardware.

Figure 4:
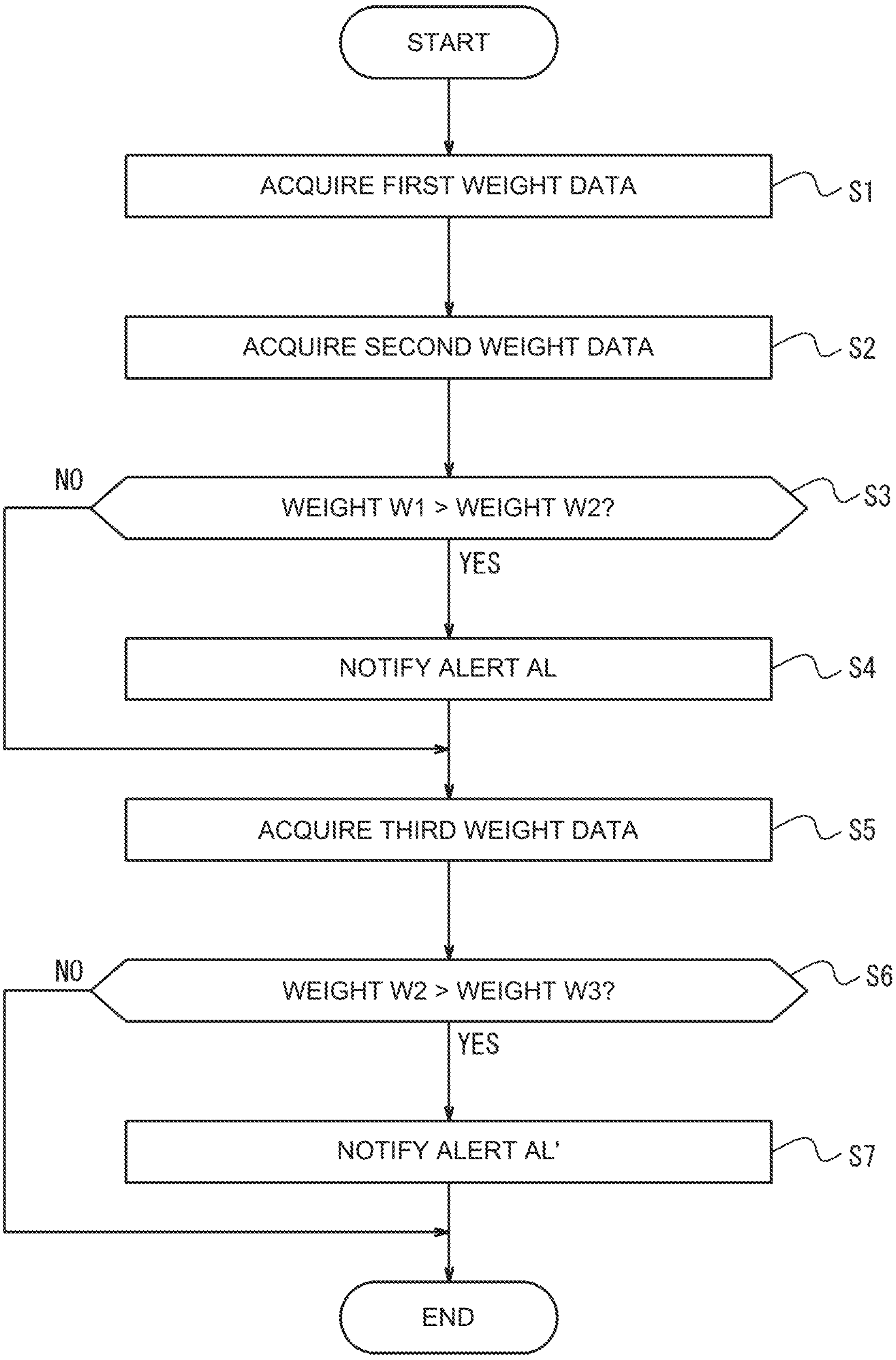
FIG. 4 is a flowchart illustrating an operation of the delivery support device according to the embodiment of the present disclosure.

The operation of the delivery support device 20 according to the present embodiment will be described with reference to FIG. 4. This operation corresponds to the delivery support method according to the present embodiment.

In S1 of steps, the control unit 21 of the delivery support device 20 acquires the first weight data WD1. The first weight data WD1 is data indicating a package LG measured at the first time point T1 in the transportation process of the package LG and a weight W1 thereof. In the present embodiment, the first time point T1 is any time point in the first period P1 from when the package LG is sent out from the sender until when it is mounted on the vehicles 40. As an example, a time point at which the package LG sent out by the user 11 as the addressee is mounted on the vehicle 40 is set as the first time point T1. The first weight data WD1 may be acquired by any procedure, but in the present embodiment, it is acquired by the following procedure.

When the package LG is mounted on the vehicle 40, the weight sensor WS1 provided in the vehicle 40 detects the weight W1 of the package LG. The vehicle 40 transmits the information indicating the value detected by the weight sensor WS1 to the delivery support device 20 as the first weight data WD1. Alternatively, the control unit 21 of the delivery support device 20 may communicate with the weight sensor WS1 via the communication unit 23, and the information indicating the value detected by the weight sensor WS1 may be directly transmitted from the weight sensor WS1 to the delivery support device 20 as the first weight data WD1. Alternatively, a worker who mounts the package LG on the vehicle 40 may measure the weight W1 of the package LG. The worker may input the measured weight W1 to the work terminal device held by the worker, and the work terminal device may transmit the information indicating the input weight W1 to the delivery support device 20 as the first weight data WD1. The control unit 21 of the delivery support device 20 receives the transmitted first weight data WD1 via the communication unit 23. In this way, the control unit 21 of the delivery support device 20 acquires the first weight data WD1 measured at the first time point T1 in the transportation process of the package LG.

As a modification of the present embodiment, a time point at which the package LG is brought to the agency of the delivery company by the sender may be set as the first time point T1. In the present modification, the package LG is carried by the sender to the brokerage store of the delivery company and is received by the salesclerk of the brokerage store. The store clerk of the agency store that has received the package LG, for example, measures the weight W1 of the package LG as part of the procedure of receiving the package LG, and inputs the measured weight W1 to the agency store terminal device installed in the agency store. The brokerage shop terminal device transmits information indicating the inputted weight W1 to the delivery support device 20 as the first weight data WD1. The control unit 21 of the delivery support device 20 receives the first weight data WD1 transmitted from the brokerage shop terminal device via the communication unit 23. In this way, the control unit 21 of the delivery support device 20 may acquire the first weight data WD1 measured at the first time point T1 in the transportation process of the package LG.

In S2 of steps, the control unit 21 of the delivery support device 20 acquires the second weight data WD2. The second weight data WD2 is data indicating a package LG measured at a second time point T2 after the first time point T1 in the transportation process of the package LG and the weight W2. In the present embodiment, the second time point T2 is any time point in the second time point P2 from when the package LG is transferred from the vehicle 40 to the logistics robot 301 until when the logistics robot 301 starts delivering the package LG. As an example, a time point at which the package LG delivered from the vehicle 40 to the logistics robot 301 as the mobile body 30 is accommodated in the logistics robot 301 is referred to as a second time point T2. The second weight data WD2 may be acquired by any procedure, but in the present embodiment, it is acquired by the following procedure.

When the cargo LG delivered from the vehicle 40 is accommodated in the logistics robot 301, the weight sensor WS2 provided in the logistics robot 301 detects the weight W2 of the cargo LG. The logistics robots 301 transmit information indicating the value detected by the weight sensor WS2 to the delivery support device 20 as the second weight data WD2. Alternatively, the control unit 21 of the delivery support device 20 may communicate with the weight sensor WS2 via the communication unit 23, and the information indicating the value detected by the weight sensor WS2 may be directly transmitted from the weight sensor WS2 to the delivery support device 20 as the second weight data WD2. The control unit 21 of the delivery support device 20 receives the transmitted second weight data WD2 via the communication unit 23. In this way, the control unit 21 of the delivery support device 20 acquires the second weight data WD2 measured at the second time point T2 in the transportation process of the package LG.

In step S3, the control unit 21 of the delivery support device 20 compares the weight W1 indicated by the first weight data WD1 acquired in step S1 with the weight W2 indicated by the second weight data WD2 acquired in step S2. Specifically, the control unit 21 determines whether the weight W2 is smaller than the weight W1. When the control unit 21 determines that the weight W2 is smaller than the weight W1, the process of the step S4 is performed.

In S4 of steps, the control unit 21 of the delivery support device 20 determines to notify the user 11 of the warning AL. Specifically, the control unit 21 generates, as the warning AL, a message notifying that at least one of the one or more items included in the package LG has been lost or stolen during the period from the first time point T1 to the second time point T2. As an example, the control unit 21 may have "lost or stolen the contents of the package while the delivery company is transporting the package to you." Contact your distributor. Create a message. The control unit 21 transmits the generated message to the terminal device 50 of the user 11 via the communication unit 23. Upon receiving the message transmitted from the delivery support device 20, the terminal device 50 outputs the received message to an output unit such as a display. The terminal device 50 may output the received message by voice from the output unit of the speaker. As a result, the user 11 is notified of the warning AL.

As described above, in the present embodiment, the control unit 21 of the delivery support device 20 that supports the delivery of the article acquires the first weight data WD1 indicating the weight W1 of the article measured at the first time point T1 in the transportation process of the article, and the second weight data WD2 indicating the weight W2 of the article measured at the second time point T2 after the first time point T1. The control unit 21 compares the weight W1 indicated by the first weight data WD1 with the weight W2 indicated by the second weight data WD2. The control unit 21 determines whether to notify the user 11 of the warning AL based on the determination result obtained by comparing the weight W1 indicated by the first weight data WD1 and the weight W2 indicated by the second weight data WD2.

Assume that one or more items out of the items stored in the package LG are dropped or extracted while the package LG containing one or more items is being transported by the vehicle 40 to the apartment house 100. According to the present embodiment, it is possible to detect that the weight of the package LG has decreased. Further, if the weight W2 measured at the second time point T2 is smaller than the weight W1 measured at the first time point T1, it can be estimated that the weight of the package LG has decreased from the first time point T1 to the second time point T2, and that the dropout or extraction of the item has occurred between the first time point T1 and the second time point T2. That is, according to the present embodiment, it is possible to identify a transportation process in which a loss or a theft has occurred without constantly monitoring an article being transported. For example, it can be determined that the loss or theft of the item has occurred in the transportation process of the package LG in the vehicle 40 by setting the time point at which the package LG is mounted on the vehicle 40 as the first time point T1 and setting the time point at which the mobile body 30 receives the package LG from the vehicle 40 as the second time point T2. By identifying which transportation process the loss or theft of goods occurred, the location of the liability is clarified, thereby reducing the risk of loss or theft of the package LG.

As a modification of the present embodiment, the control unit 21 of the delivery support device 20 may further acquire the third weight data WD3. The third weight data WD3 is data indicating a weight W3 of the package LG measured at a third period P3 any time from when the mobile body 30 starts delivering the package LG until when the package LG is delivered to the user 11 who is the addressee of the package LG, which is measured at T3 of the third time point. The control unit 21 may determine whether to notify the user 11 of the warning AL' based on the weight W2 indicated by the second weight data WD2 and the weight W3 indicated by the third weight data WD3. Specifically, the control unit 21 of the delivery support device 20 acquires the third weight data WD3 in the step S5 of FIG. 4. The third weight data WD3 may be obtained by any procedure, but in the present modification, the third weight data may be obtained by the following procedure.

In the present modification, at the third time point T3 after the logistics robot 301 containing the package LG starts traveling to the delivery destination of the package LG, the weight sensor WS2 provided in the logistics robot 301 detects the weight W3 of the package LG. In the present modification, a time point at which the elapsed time since the logistics robot 301 as the mobile body 30 starts delivering the package LG exceeds the threshold value is set as the third time point T3. The thresholds can be arbitrarily set so as not to exceed the length of the third period P3. For example, assume that the third period P3 is 20 minutes and the thresholds are set to 10 minutes. When ten minutes have elapsed since the logistics robots 301 started delivering the package LG, the weight sensor WS2 detects the weight of the package LG. The logistics robots 301 transmit the information indicating the value detected by the weight sensor WS2 to the delivery support device 20 as the third weight data WD3. Alternatively, the control unit 21 of the delivery support device 20 may communicate with the weight sensor WS2 via the communication unit 23, and the information indicating the value detected by the weight sensor WS2 may be directly transmitted from the weight sensor WS2 to the delivery support device 20 as the third weight data WD3. The control unit 21 of the delivery support device 20 receives the transmitted third weight data WD3 via the communication unit 23. In this way, the control unit 21 of the delivery support device 20 acquires the third weight data WD3 measured at the third time point T3 in the transportation process of the package LG.

In step S6, the control unit 21 of the delivery support device 20 compares the weight W2 indicated by the second weight data WD2 acquired in step S2 with the weight W3 indicated by the third weight data WD3 acquired in step S5. Specifically, the control unit 21 determines whether the weight W3 is smaller than the weight W2. When the control unit 21 determines that the weight W3 is smaller than the weight W2, the process of the step S7 is performed.

In S7 of steps, the control unit 21 of the delivery support device 20 determines to notify the user 11 of the warning AL'. Specifically, the control unit 21 generates, as the warning AL', a message notifying that at least one of the one or more items included in the package LG has been lost or stolen during the period from the second time point T2 to the third time point T3. The control unit 21 transmits the generated message to the terminal device 50 of the user 11 via the communication unit 23. As an example, the control unit 21 "There is a possibility that the contents of the package were lost or stolen while the in-house logistics robot was transporting the package to you. Contact the in-house logistics robot management company. A message is generated. The control unit 21 transmits the generated message to the terminal device 50 of the user 11 via the communication unit 23. Since the subsequent processing by the terminal device 50 of the user 11 is the same as the processing by the terminal device 50 of the user 11 in the step S4, the explanation thereof is omitted.

As described above, the control unit 21 of the delivery support device 20 further acquires the third weight data WD3 at a third time point T3 that is any time in the third period P3 from when the mobile body 30 starts delivery of the package LG until when the package LG is delivered to the addressee of the package LG, the third weight data WD3 indicating the weight W3 of the package LG. The control unit 21 determines whether to notify the user 11 of the warning AL' based on the weight W2 indicated by the second weight data WD2 and the weight W3 indicated by the third weight data WD3.

According to the present modification, it can be estimated that the weight of the package LG has decreased from the second time point T2 to the third time point T3, and that the dropout or the extraction of the item has occurred between the second time point T2 and the third time point T3. That is, according to the present embodiment, it is possible to identify a transportation process in which a loss or a theft has occurred without constantly monitoring an article being transported. For example, it can be determined that the loss or theft of the item has occurred in the transportation process of the package LG by the logistics robot 301 by setting the time point at which the logistics robot 301 as the mobile body 30 receives the package LG from the vehicle 40 as the second time point T2 and T3 the time point at which the elapsed time since the logistics robot 301 starts delivering the package LG exceeds the threshold value at the third time point. That is, even when one or more items of the items stored in the package LG are dropped or extracted during transportation of the package LG to the house 121 of the user 11 by the mobile body 30, the loss or theft of the items can be detected. In this way, the transportation process in which the lost or stolen item has occurred can be specified in more detail. Thus, the location of the responsibilities becomes clearer, so that the risk of loss or theft is further reduced.

As a further modification of the present modification, the mobile body 30 may be provided with a door sensor CS for detecting that the door CV of the accommodation unit for accommodating the package LG is opened, and the control unit 21 of the delivery support device 20 may acquire, together with the time stamp, data indicating that the door CV detected by the door sensor CS during the third period P3 has been opened. The control unit 21 may specify a time point at which the door CV is opened based on the acquired data and the time stamp, and may determine that the specified time point is a time point at which the article is lost or stolen.

The door CV may be obtained by any procedure, but in the present modification, it is obtained by the following procedure. In the present modification, the door sensor CS is provided, for example, on the door CV of the storage unit that stores the package LG of the logistics robots 301. The door sensor CS is, for example, a vibration sensor or an acceleration sensor. The door sensor CS detects an impact applied to the door CV. When the door CV of the accommodation unit for accommodating the package LG is opened in the third period P3 from when the logistics robot 301 accommodating the package LG starts delivering the package LG to when the package LG is delivered to the addressee, the door CV vibrates and the door sensor CS detects an impact. When an impact is detected by the door sensor CS, the logistics robot 301 transmits information indicating that an impact is detected by the door sensor CS to the delivery support device 20 together with a time stamp. Alternatively, the control unit 21 of the delivery support device 20 may communicate with the door sensor CS via the communication unit 23, and information indicating that an impact has been detected by the door sensor CS may be directly transmitted from the door sensor CS to the delivery support device 20 together with the time stamp. The control unit 21 of the delivery support device 20 receives, via the communication unit 23, the transmitted information together with the time stamp as data indicating that the door CV detected by the door sensor CS is opened. In this way, the control unit 21 acquires, together with the time stamp, the data indicating that the door CV detected by the door sensor CS is opened during the third period P3.

When data indicating that the door CV has been opened is acquired together with the time stamp during the third period P3, the control unit 21 of the delivery support device 20 refers to the acquired data and time stamp to specify a time point at which the door CV of the storage unit has been opened, and determines that the specified time point is a time point at which the item has been lost or stolen.

According to this modification, when one or more items of the items stored in the package LG are dropped or extracted during transportation of the package LG to the house 121 of the user 11 by the mobile body 30, the point in time at which the items are lost or stolen can be specified. Since the point in time of loss or theft of the item is identified, the cause of the loss or theft can be easily identified, for example, by identifying the position of the logistics robot 301 at the identified point in time and investigating the vicinity of the site. Thus, the risk of loss or theft is further reduced.

As a modification of the present embodiment, the user 11 who has notified the warning AL or AL' by the step S4 or S7 may be further allowed to select a countermeasure against the loss or the theft. Specifically, the control unit 21 of the delivery support device 20 may perform control such that a button for activating a desired corresponding means is displayed on the display of the terminal device 50 together with a warning message. The response means includes, for example, notifying the police and capturing an image of the surroundings. The user 11, for example, touches an image of a button displayed on the display to operate a touch panel as an input unit of the terminal device 50 to select a corresponding unit. The terminal device 50 transmits the identifier of the selected correspondence means to the delivery support device 20.

According to the present modification, the user 11 notified of the warning AL or the warning AL' can easily take a countermeasure against loss or theft. Thus, the risk of loss or theft is further reduced.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

For example, the delivery support device 20 may be provided in the vehicle 40.

In the following, some of the embodiments of the present disclosure will be illustrated. However, it should be noted that embodiment of the present disclosure is not limited to these.

APPENDIX 1

A delivery support device for supporting delivery of an article,

A first weight data indicating a weight of an article measured at a first time point in a transport process of an article and a second weight data indicating a weight of an article measured at a second time point after the first time point are obtained.

The delivery support device includes a control unit that determines whether to notify a user of a warning based on a result of comparing the weight indicated by the first weight data with the weight indicated by the second weight data.

APPENDIX 2

An article is a package containing one or more items therein,

The first time point is any time point in the first period from when the package is sent out from the sender to when it is mounted on a vehicle that houses and transports the package, The second time point is any time point in the second period from when the package is delivered from the vehicle to the mobile body that delivers the package to the delivery destination until when the mobile body starts delivering the package.

The delivery support device according to Appendix 1, wherein the control unit compares the weight indicated by the first weight data with the weight indicated by the second weight data, and determines to notify the user of a warning when it is determined that the weight indicated by the second weight data is smaller than the weight indicated by the first weight data.

APPENDIX 3

The delivery support device according to claim 2 or 3, wherein the control unit generates a message notifying that at least one of the one or more items has been lost or stolen between the 1 time point and the 2 time point as an alarm

APPENDIX 4

The control unit further acquires third weight data indicating the weight of the package measured at the third time point that is any time point in the third period from when the mobile body starts delivering the package until when the package is delivered to the addressee of the package, The delivery support device according to any one of Appendices 1 to 3, wherein the control unit determines whether to notify the user of the warning based on a result of comparing the weight indicated by the second weight data with the weight indicated by the third weight data.

APPENDIX 5

The delivery support device according to any one of Appendices 1 to 4, wherein the control unit generates, as a warning, a message notifying that at least one of the one or more items has been lost or stolen between the second time point and the third time point.

APPENDIX 6

A communication unit configured to communicate with a terminal device held by a user, The delivery support device according to any one of Appendices 1 to 5, wherein the control unit transmits information indicating a warning to the terminal device via the communication unit.

APPENDIX 7

The delivery support device according to any one of Appendices 1 to 6,

With the terminal device

A system comprising:

APPENDIX 8

The mobile body is provided with a weight sensor for detecting the weight of the load.

A communication unit configured to communicate with the mobile body,

The delivery support device according to any one of Appendices 1 to 7, wherein the control unit receives, via the communication unit, data indicating a value detected by the weight sensor transmitted from the mobile object, and acquires the received data as the second weight data.

APPENDIX 9

The mobile body is provided with a door sensor for detecting that the door of the accommodating portion for accommodating the load is opened.

A communication unit configured to communicate with the mobile body,

The control unit communicates with the mobile object via the communication unit, and acquires data indicating that the door detected by the door sensor is opened during the third period together with the time stamp.

The control unit specifies a time point at which the door of the storage unit is opened based on the acquired data and the time stamp.

The delivery support device according to any one of Appendices 1 to 8, wherein the control unit determines that the specified time point is a time point when the article is lost or stolen.

APPENDIX 10

The delivery support device according to any one of Appendices 1 to 8,

With a mobile object

A system comprising:

APPENDIX 11

A communication unit configured to communicate with the vehicle,

The delivery support device according to any one of Appendices 1 to 8, wherein the control unit receives, as the first weight data, data indicating the weight of the package transmitted from the vehicle.

APPENDIX 12

A delivery support device according to Appendix 11,

With the vehicle

A system comprising:

APPENDIX 13

A delivery support method for supporting delivery of goods,

The control unit acquires first weight data indicating a weight of an article measured at a first time point in a transport process of an article, and second weight data indicating a weight of an article measured at a second time point after the first time point.

The control unit compares the weight indicated by the first weight data with the weight indicated by the second weight data, A delivery support method comprising: determining, by a control unit, whether to notify a user of a warning based on a determination result obtained by comparing a weight indicated by first weight data with a weight indicated by second weight data.

APPENDIX 14

An article is a package containing one or more items therein,

The first time point is any time point in the first period from when the package is sent out from the sender to when it is mounted on a vehicle that houses and transports the package, The second time point is any time point in the second period from when the package is delivered from the vehicle to the mobile body that delivers the package to the delivery destination until when the mobile body starts delivering the package.

The control unit compares the weight indicated by the first weight data with the weight indicated by the second weight data, and determines to notify the user of a warning when it is determined that the weight indicated by the first weight data is smaller than the weight indicated by the second weight data The delivery support method according to Appendix 13, including:

APPENDIX 15

The delivery support method according to Appendix 13 or 14, wherein the control unit generates, as an alarm, a message notifying that at least one of the one or more items has been lost or stolen during a period from the first time point to the second time point.

APPENDIX 16

The control unit further acquires third weight data indicating a weight of the package measured at a third time point that is any time in a third period from when the mobile body starts delivering the package until when the package is delivered to the addressee of the package.

A control unit determines whether a warning is notified to a user further based on the result of comparing the weight shown by the second weight data, and the weight shown by the 3rd weight data The delivery support method according to any one of Appendices 13 to 15, including.

APPENDIX 17

The delivery support method according to any one of Appendices 13 to 16, wherein the control unit generates, as a warning, a message notifying that at least one of the one or more items has been lost or stolen between the second time point and the third time point.

APPENDIX 18

A communication unit configured to communicate with a terminal device held by a user;

To transmit information indicating a warning to a terminal device via a communication unit by a control unit The delivery support method according to any one of Appendices 13 to 17, including.

APPENDIX 19

The mobile body is provided with a weight sensor for detecting the weight of the load.

A communication unit configured to receive data indicating a value detected by the weight sensor transmitted from the mobile object;

The control unit acquires the received data as the second weight data

The delivery support method according to any one of Appendices 13 to 14, including.

APPENDIX 20

The mobile body is provided with a door sensor for detecting that the door of the accommodating portion for accommodating the load is opened.

The communication unit receives data indicating that the door detected by the door sensor is opened during the third period, which is transmitted from the mobile object together with the time stamp.

The control unit acquires the received data, and specifies a time point at which the door of the storage unit is opened based on the acquired data and the time stamp.

The control unit determines that the specified time point is a time point at which an article is lost or stolen The delivery support method according to any one of Appendices 13 to 19, including.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A delivery support device that supports delivery of an article, the delivery support device comprising a control unit that acquires first weight data indicating a weight of the article measured at a first time point in a transportation process of the article and second weight data indicating a weight of the article measured at a second time point after the first time point, determines whether to notify a user of a warning, based on a result of comparing the weight indicated by the first weight data with the weight indicated by the second weight data, wherein:

the article is a package containing one or more items inside;

the first time point is any time point in a first period from when the package is sent out from a sender until when the package is mounted on a vehicle that stores and transports the package;

the second time point is any time point in a second period from when the package is delivered from the vehicle to a mobile body that delivers the package to a delivery destination of the package until when the mobile body starts delivering the package;

when the control unit compares the weight indicated by the first weight data with the weight indicated by the second weight data and the control unit determines that the weight indicated by the second weight data is smaller than the weight indicated by the first weight data, the control unit determines to notify the user of a warning, the control unit further acquires third weight data indicating a weight of the package measured at a third time point that is any time point in a third period from when the mobile body starts delivering the package until when the package is delivered to an addressee of the package; and the control unit determines whether to notify the user of a warning, further based on a result of comparing the weight indicated by the second weight data and the weight indicated by the third weight data; and a communication unit that communicates with the mobile body, wherein:

the mobile body is provided with a door sensor that detects that a door of a storage unit that stores the package is opened;

the control unit communicates with the mobile body via the communication unit, and acquires, together with a time stamp, data indicating that the door detected by the door sensor has been opened during the third period;

the control unit specifies a time point at which the door of the storage unit is opened based on the acquired data and the acquired time stamp; and the control unit determines that the specified time point is a time point at which the item is lost or stolen.

2. The delivery support device according to claim 1, wherein the control unit generates, as the warning, a message notifying that at least one among the one or more items has been lost or stolen during a period from the first time point to the second time point.

3. The delivery support device according to claim 1, wherein the control unit generates, as the warning, a message notifying that at least one among the one or more items has been lost or stolen during a period from the second time point to the third time point.

4. The delivery support device according to claim 1, further comprising a communication unit that communicates with a terminal device held by the user, wherein the control unit transmits information indicating the warning to the terminal device via the communication unit.

5. A system comprising:

the delivery support device according to claim 4; and the terminal device.

6. The delivery support device according to claim 1, further comprising a communication unit that communicates with the mobile body, wherein:

the mobile body is provided with a weight sensor for detecting a weight of the package; and the control unit receives, via the communication unit, data indicating a value detected by the weight sensor and transmitted from the mobile body, and acquires the received data as the second weight data.

7. A system comprising:

the delivery support device according to claim 6; and the mobile body.

8. The delivery support device according to claim 1, further comprising a communication unit that communicates with the vehicle, wherein the control unit receives data indicating a weight of the package transmitted from the vehicle, as the first weight data.

9. A system comprising:

the delivery support device according to claim 8; and the vehicle.

10. A delivery support method that supports delivery of an article, the delivery support method comprising:

causing a control unit to acquire first weight data indicating a weight of the article measured at a first time point in a transportation process of the article, and second weight data indicating a weight of the article measured at a second time point after the first time point;

causing the control unit to compare the weight indicated by the first weight data with the weight indicated by the second weight data;

causing the control unit to determine whether to notify a user of a warning, based on a determination result acquired by comparing the weight indicated by the first weight data with the weight indicated by the second weight data, wherein:

the article is a package containing one or more items inside;

the first time point is any time point in a first period from when the package is sent out from a sender until when the package is mounted on a vehicle that stores and transports the package;

the second time point is any time point in a second period from when the package is delivered from the vehicle to a mobile body that delivers the package to a delivery destination of the package until when the mobile body starts delivering the package;

when the control unit compares the weight indicated by the first weight data with the weight indicated by the second weight data and the control unit determines that the weight indicated by the second weight data is smaller than the weight indicated by the first weight data, the control unit determines to notify the user of a warning;

causing the control unit to further acquire third weight data indicating a weight of the package measured at a third time point that is any time point in a third period from when the mobile body starts delivering the package until when the package is delivered to an addressee of the package;

causing the control unit to determine whether to notify the user of a warning, further based on a result of comparing the weight indicated by the second weight data with the weight indicated by the third weight data, wherein the mobile body is provided with a door sensor that detects that a door of a storage unit that stores the package is opened, and the delivery support method further comprises:

causing a communication unit to receive data indicating that the door detected by the door sensor is opened during the third period, the data being transmitted from the mobile body with a time stamp, causing the control unit to acquire the received data, and specify a time point at which the door of the storage unit is opened based on the acquired data, and causing the control unit to determine that the specified time point is a time point at which the item is lost or stolen.

11. The delivery support method according to claim 10, further comprising causing the control unit to generate, as the warning, a message notifying that at least one among the one or more items has been lost or stolen during a period from the first time point to the second time point.

12. The delivery support method according to claim 10, further comprising causing the control unit to generate, as the warning, a message notifying that at least one among the one or more items has been lost or stolen during a period from the second time point to the third time point.

13. The delivery support method according to claim 10, further comprising:

causing a communication unit to communicate with a terminal device held by the user; and causing the control unit to transmit information indicating the warning to the terminal device via the communication unit.

14. The delivery support method according to claim 10, wherein:

the mobile body is provided with a weight sensor that detects a weight of the package, and the delivery support method further comprises:

causing a communication unit to receive data indicating a value detected by the weight sensor and transmitted from the mobile body; and causing the control unit to acquire the received data as the second weight data.

* * * * *